March 1, 1966 M. W. KIESAU ETAL 3,237,992
DETACHABLE AUXILIARY TRACTOR TIRE APPARATUS
Filed Feb. 27, 1964
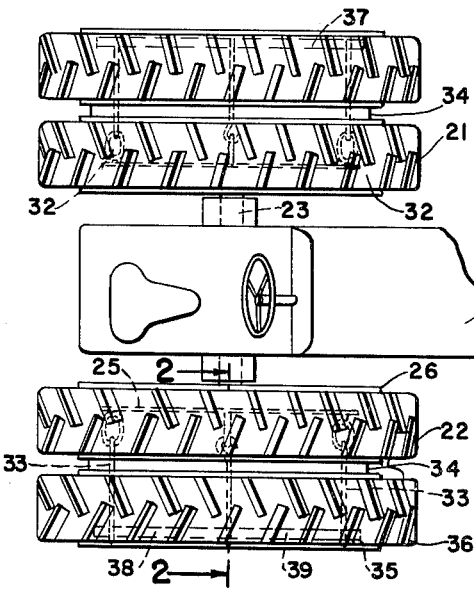
FIG. 1.
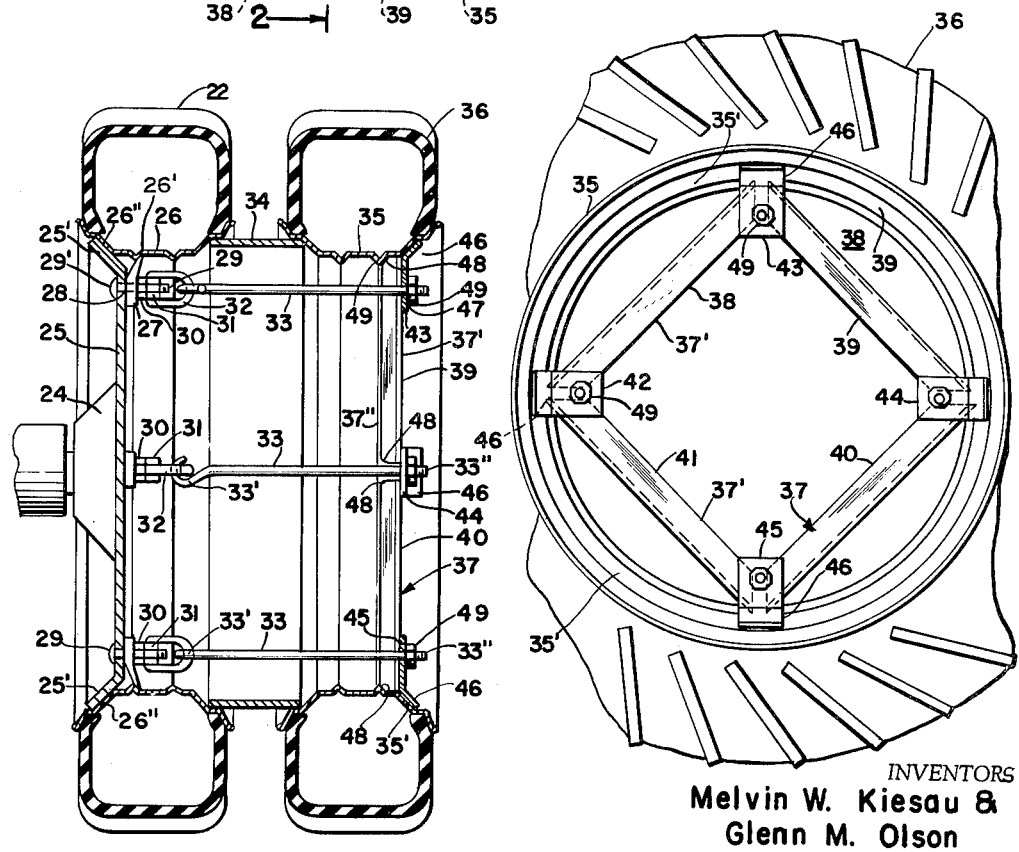
FIG. 3.
FIG. 2.
INVENTORS
Melvin W. Kiesau &
Glenn M. Olson
BY Robert E. Kleve
ATTORNEY ated Mar. 1, 1966

3,237,992
DETACHABLE AUXILIARY TRACTOR TIRE APPARATUS
Melvin W. Kiesau, 1201 N. 5th St., East Grand Forks, Minn., and Glenn M. Olson, 1912 6th Ave. N., Grand Forks, N. Dak.
Filed Feb. 27, 1964, Ser. No. 347,939
6 Claims. (Cl. 301—36)

This invention relates to tractor equipment and the like, more particularly this invention relates to tractors and to an apparatus for detachably mounting an auxiliary tractor tire.

It is an object of this invention to provide a novel structure for detachably mounting an auxiliary or second tractor tire on each side of the tractor for additional traction.

It is a further object of this invention to provide a novel structure for rapidly attaching a second tractor tire on each side of the tractor to provide a dual set of tires on each side of the tractor for additional traction, and to provide a novel structure for rapidly and easily detaching the second tire, when desired.

It is a further object of this invention to provide a novel structure for rapidly attaching and detaching an auxiliary tire and which can be produced simply and inexpensively and attached and detached in a minimum amount of time.

Further objects and advantages of the invention will become apparent as the description proceeds and when taken in conjunction with the accompanying drawings wherein:

FIGURE 1 is a top plan view of the detachably mounted auxiliary tractor tire apparatus with the auxiliary tractor tires detachably mounted to a conventional tractor.

FIGURE 2 is a cross-sectional view taken along line 2—2 of FIGURE 1 and illustrating the appartus for detachably mounting the auxiliary tire to the regular tractor tire of a tractor.

FIGURE 3 is a fragmentary side elevational view of one of the auxiliary tractor tires disclosing the brace of the apparatus for detachably mounting the auxiliary tire.

Briefly stated the invention comprises a detachably mounted auxiliary tractor tire apparatus for detachably mounting a second or auxiliary tractor tire on each side of the tractor and coaxially with the regular tractor tire. Said apparatus further having a rectangular brace abutting the outside of the auxiliary tire and four rods held to the brace by four nuts with the rods projecting through the central portion of the auxiliary tire and the regular tire and having hooks at their inner ends which hooks are hooked into eyelets on the regular tire rim structure.

The invention further includes a cylindrical collar spacer detachably fitted between the rim of the regular tire and the rim of the auxiliary tire, which spaces the two tires apart and which is held in place by the hook rods and brace tightening the two tires and their rims together.

With further, more detailed reference to the drawings in FIGURE 1; a conventional tractor 20 is illustrated having a conventional inner left rear rubber tractor tire and rim 21 and a conventional inner right rear rubber tractor tire and rim 22.

The left and right inner tractor tires 21 and 22 both driven by a conventional drive shaft construction 23, which shafts are conventionally connected to an annular hub 24 is welded or otherwise fixed to an enlarged plate 25 as illustrated in FIGURE 2.

The right inner tire 22 is conventionally attached to the tractor by the enlarged plate wheel or hub 25 which is attached conventionally to the rim 26 of the inner right tire 22 by means of lugs 27, which lugs 27 abut the rim 26 along the annular ridge 26'. The enlarged plate 25 has a rearwardly annular tapered portion 25' which abuts the tapered face 26" of the inner rim 26. The plate 25 and the lugs 27 have aligned bores 28 for threaded bolts 29 to pass through. The bores 28 may be smooth to receive the bolts.

The bolts 29 have an enlarged head 29' at one end and are threaded along the other end. A nut 30 is threaded onto the bolt 29 to tighten the lugs and the enlarged plate 25 together and thereby secure the plate 25 to the rim 26.

Four nuts 31 are threaded onto the bolts 29 and tightened against the nuts 30. Each nut 31 has an eyelet or ring 32 welded thereon. Four metal rods 33 each having hooks 33' at their one end and threaded along their other end 33" are hooked onto the eyelets 32.

A sheet metal cylindrical collar 34 is detachably fitted between the rim 26 of the inner right tire 22 and the rim 35 of an outer auxiliary tire 36.

A rectangular frame 37 acts as a brace and comprises four angle irons 38, 39, 40, and 41. Each angle iron has one elongated flat steel portion 37' and another elongated flat steel portion 37" perpendicular to one another and integrally connected to one another along their length to form an L-shaped cross section. Four rectangular flanges 42, 43, 44, and 45 are welded to the angle irons where they intersect at their converging remote ends. The flanges each having an outwardly bent tongue portion 46 which abuts the tapered annular face portion 35' of the rim 35. The flanges each having a central bore 47 for receiving the threaded ends 33" of the rod.

The four angle irons 38, 39, 40, and 41 each have diagonal corners 48 at the opposite remote ends of their elongated steel portion 37". The diagonal corners abut the outer face of the V-shaped annular ridge 49 of the outer rim 35 in generally parallel complementary relation. The bores 47 are oversized with respect to the rods to allow them to pass freely through.

Four nuts 50 are threaded onto the outer ends 33" of the rods which tighten the assembly together by drawing the hooks against the eyelets and tighten the rectangular brace against the rim of the auxiliary tire and thereby tighten the auxiliary tire to the collar and the collar to the rim of the inner tire.

Eight raised portions or mounds 51 formed on the outer face of the rim 35 engage the brace along the edges of the brace 37 to prevent the brace from rotating or shifting relative to the rim 35.

The left rear auxiliary tire 40 is attached with identical structure as used to attach the right rear auxiliary tire, including the brace 37, the collar or spacer 34 and the rods 33 and etc.

The right rear auxiliary tire 35 and its associated structure may be detached by simply removing the nuts 49 and thereafter removing the brace 37, unhooking the rods 33 from the eyelets, and thereafter removing the auxiliary tire 36 and its rim 35 and the spacer 34.

The eyelets 33 and their nut portion 32 may be left on for the next time it is desired to use the auxiliary tires. The left auxiliary tire 40 and its associated structure may be removed in the identical manner.

When the brace and auxiliary tires and associated structure are removed as described, the tractor may be used conventionally with only the tires 22 and 23.

The auxiliary tires may be attached by the reverse method, of simply placing the spacer between the inner tire rim 26 and the outer rim 35 and attaching the rods to the eyelets and sliding the ends of the rods into the apertures of the rectangular brace 37 and thereafter threading the nuts 49 onto the rods.

Thus it will be apparent from the foregoing disclosure that the invention provides a novel inexpensive bracing structure for rapidly and easily detaching and attaching auxiliary tires and which auxiliary tires provide additional traction and stability for the tractor.

It will be obvious that various changes and departures may be made to the invention without departing from the spirit and scope thereof and accordingly it is not intended that the invention be limited to that specifically described and shown in the specification or illustrated in the drawing but only as set forth in the appended claims herein.

What is claimed is:

1. A detachably mounted auxiliary tractor tire apparatus for a tractor having wheel means, said wheel means including a first tire and rim, said apparatus comprising a second tire and rim, cylindrical spacing means between said first and second rims, a brace extending across said second rim in perpendicular relation to the rotational axis of said rims, said brace comprising elongated members having converging connected corners with said corner edges abutting said second rim in edgewise relation, rods passing through said second and first rims, said rods each being detachably mounted to said wheel means at their one end and detachably mounted to said brace at their other end.

2. A detachably mounted auxiliary tire apparatus for a tractor having wheel means, said wheel means including a first tire and rim, said apparatus comprising a second tire and rim, detachably mounted spacing means between said first and second rims, a brace extending across said second rim in perpendicular relation to the rotational axis of said rims, said brace comprising elongated members having converging connected corners with said corner edges of said elongated members abutting said rim in edgewise relation, said members being directed toward said first rim, said corners also having projecting flanges projecting beyond said corners, said projecting flanges having surfaces directed toward said first rim which engage said second rim, rods passing through said second and first rim, attaching means on said wheel means, said rods and said attaching means having cooperating hook like means to detachably connect said attaching means and rods together, means to secure said rods at their other end to said brace.

3. A detachably mounted auxiliary tractor tire apparatus for a tractor having wheel means, said wheel means including a first tire and rim, said apparatus comprising a second tire and rim, detachable spacing means between said first and second rim, a rectangular brace across the exterior of said second rim in perpendicular relation to the rotational axis of said rims, said rectangular brace having corner edges conforming to the surfaces of said second rim, said corner edges including portions abutting and conforming to the cylindrical interior of said second rim with said portions abutting said second rim projecting toward said first rim, four rods secured at their one end to each corner of said brace, said rods being detachably secured at their other end to said wheel means.

4. A detachably mounted auxiliary tractor tire apparatus for a tractor having wheel means including a first tire rim, said apparatus comprising a second tire rim, a brace extending across the exterior of said second rim in perpendicular relation to the rotational axis of said rims, said brace having projecting edges along its outer portions projecting toward said first rim and abutting said second rim, a plurality of rods secured at their one ends to said brace adjacent said projecting portions, said rods projecting inwardly through said second rim and having hooks at their inner ends, said first tire rim having eyelets mounted to said wheel means with said hooks attached to said eyelets, a detachable annular spacer between said first and second rim.

5. A detachably mounted auxiliary tractor tire apparatus for a tractor having a tractor wheel with said tractor wheel including a first tire and rim, said device comprising a second tire and rim, an annular metal sleeve fitted between said first and second tire rim, a plurality of eyelets fixed to and adjacent said wheel, a plurality of rods each having a hook at its inner end adapted to be hooked into said eyelets, a rectangular frame formed of angle irons adjacent said second rim, and abutting an axial outward facing flange of said second rim, said frame having inner faces fitted against said second rim, said flanges having apertures for receiving the outer end of said rods, a plurality of nuts threaded onto said rods to tighten said second tire rim in coaxial relation to said first tire rim with said annular sleeve therebetween, said second tire rim having an annular ridge, said angle irons having diagonal corners abutting said annular ridge.

6. A detachably mounted auxiliary tractor tire apparatus for a tractor having a tractor wheel with said wheel including a regular tractor tire rim, said device comprising a second tire rim on the outside of said regular tire rim in coaxial relation therewith, a rectangular metal frame formed of elongated members each comprising a pair of elongated flanges connected together laterally of one another, one of said flanges of each pair extending inwardly toward said first tire rim, said rectangular frame abutting the exterior of said second tire rim with the remote ends of said inwardly extending flanges having portions engaging said second tire rim in a direction inwardly toward said first tire rim, a plurality of rods secured to said frame by threaded nuts, said rods projecting inwardly through the central portion of said second tire rim to said regular tire rim and having hooks at their projecting ends, eyelets threaded onto bolts on said wheel with said hooks attached to said eyelets, an annular cylindrical spacer adapted to be detachably secured between said second and regular tire rim.

References Cited by the Examiner

UNITED STATES PATENTS

| 607,035 | 3/1901 | Sawyer | 85—32 X |
| 1,327,607 | 1/1920 | Baker. | |
| 1,689,968 | 10/1928 | Pounds | 301—36 |
| 1,876,720 | 9/1932 | Merrill. | |
| 3,082,040 | 3/1963 | Degerness | 301—36 |

FOREIGN PATENTS 448,052  11/1912  France.

BENJAMIN HERSH, *Primary Examiner.*
ARTHUR L. LA POINT, *Examiner.*
R. J. JOHNSON, *Assistant Examiner.*